April 24, 1956     D. MacK. McLAREN     2,742,712
SOLID MATERIAL FEEDERS
Filed Dec. 16, 1952     2 Sheets-Sheet 1
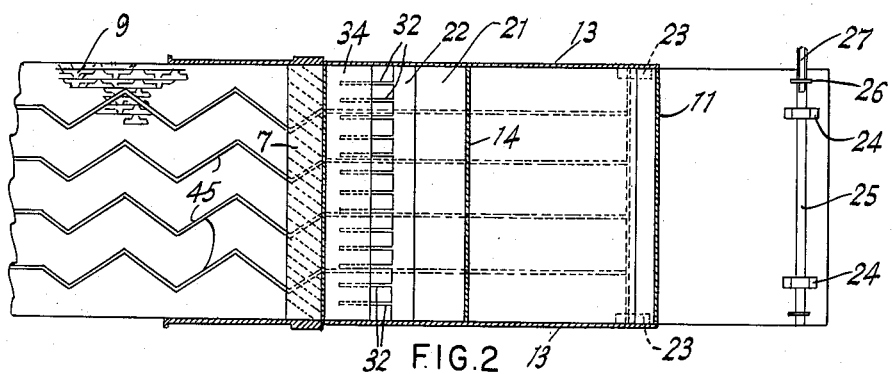
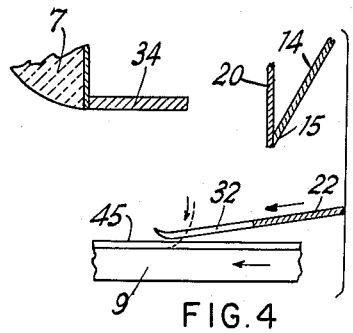
FIG.4
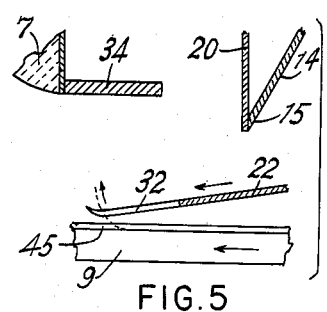
FIG.5
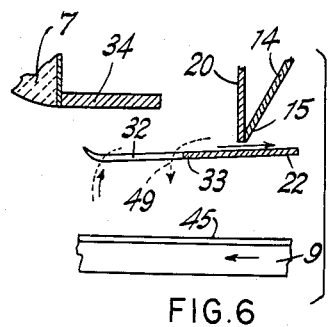
FIG.6
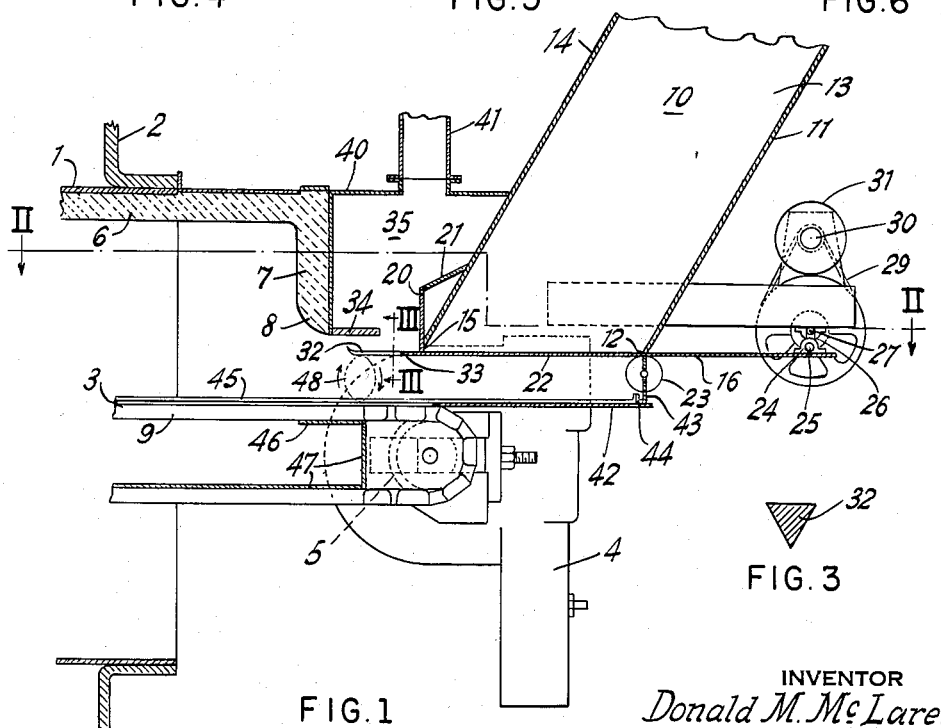
FIG.1
INVENTOR
Donald M. McLaren
BY
*J. P. Moran*
ATTORNEY April 24, 1956 D. MacK. McLAREN 2,742,712
SOLID MATERIAL FEEDERS
Filed Dec. 16, 1952 2 Sheets-Sheet 2

INVENTOR
Donald M. McLaren
BY JPMoran
ATTORNEY

United States Patent Office 2,742,712
Patented Apr. 24, 1956

2,742,712

SOLID MATERIAL FEEDERS

Donald MacKinley McLaren, Glasgow, Scotland, assignor to The Babcock & Wilcox Company, New York, N. Y., a corporation of New Jersey Application December 16, 1952, Serial No. 326,181

11 Claims. (Cl. 34—164)

This invention relates to feeders for divided solid materials having adherent properties, and in particular to feeders for such materials containing varying percentages of moisture or liquid, such as a coal slurry.

In feeding coal slurry onto a traveling grate stoker, for example, difficulty is experienced in maintaining a steady flow. The flow through the usual form of hopper is normally very erratic, and, unless poking or some other form of agitation is employed, adhesion to the hopper walls and bridging are liable to cause complete stoppage of the flow of the slurry to the grate. A similar difficulty may arise in connection with a chute feeding coal slurry onto a conveyor belt or the like. Similar difficulties are encountered in the feeding of materials other than coal slurry, such as, for example, types of vegetable refuse fuel and chemical plant products of muddy, clayey, or pasty consistency.

The main object of this invention is the provision of a feeder construction adapted to give a more reliable and uniform flow of solid material of the character described than has been heretofore obtainable with a hopper or chute of the usual form.

A further and more specific object is to provide a feeder which has a tendency to mix the material to be fed whereby material of uneven moisture content will be well mixed prior to use. A still further object is the provision of a feeder construction which is adapted to dry the material being fed.

In accordance with my invention, a feeder is associated with a container for solid material having adherent properties and comprises a platform adapted to periodically open and close the lower end of the container through combined translatory oscillations and rotational oscillations given to the platform. The translatory oscillations are arranged to effect movement of the material to be discharged from the container in a forward direction and the rotational oscillations are adapted through upward movement towards a scraping device to inhibit rearward movement with the platform of the solid material carried by the platform. When employed for delivering a solid fuel to a furnace, a traveling grate is preferably arranged to receive the material falling from the feeder platform and to move it into the furnace.

For a better understanding of my invention, its operating advantages and specific objects obtained by its use, reference should be had to the accompanying drawings and descriptive matter in which I have illustrated and described several preferred embodiments of my invention.

The invention will now be described, by way of example, with reference to the accompanying partly diagrammatic drawings, in which:

Fig. 1 is a sectional side view at the firing end of a Lancashire type boiler of which a furnace flue is fitted with an endless chain grate stoker, and including a feeder for delivering coal slurry for burning on the chain grate;

Fig. 2 is a plan view of the feeder and a front portion of the chain grate stoker in section on the line II—II of Fig. 1;

Fig. 3 is an enlarged sectional view on the line III—III of Fig. 1 of one of the teeth hereinafter referred to;

Figs. 4, 5 and 6 show to a larger scale parts of the apparatus shown in Fig. 1, illustrating different operating positions of the feeder platform and of the teeth;

Figure 7:
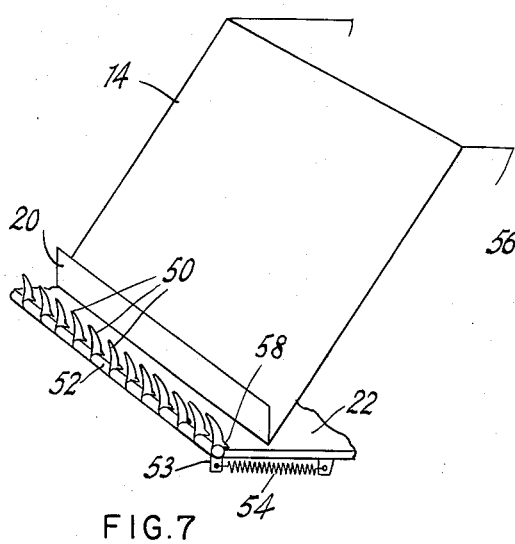
Fig. 7 is a perspective fragmentary view of a modified feeder.

Referring to Figs. 1 to 3 of the drawings, an internal cylindrical furnace flue 1 terminating in an end plate 2 at the firing end of a Lancashire type boiler is fitted with a chain grate stoker 3, driven by a motor 4 through a sprocket 5 at its end nearer its point of fuel reception.

Above the grate the fuel-receiving end of the flue 1 is protected by an arcuate fire brick arch 6; this arch is extended outside the boiler shell to a vertical screen 7 having a horizontal bottom edge 8 spaced from the upper run 9 of the grate. Between the adjacent end of the grate and the screen, combustible slurry is arranged to be deposited on the grate by a feeder.

The feeder includes a hopper or container 10 for containing a reservoir of slurry. The hopper has a fixed rear wall 11 sloping downwardly and forwardly, at an angle of 60° to the horizontal, to a horizontal lower edge 12, fixed vertical side walls 13, and a front wall 14 also sloping downwardly and forwardly at an angle of 60° to the horizontal and terminating in a horizontal lower edge 15 usually at the same height as the lower edge 12 of the rear wall. To the lower edge of the front plate there is welded the lower edge of a vertical scraper plate 20 extending across the width of the hopper. The top edge of the plate 20 is located by a strengthening plate 21 welded thereto and to the rear wall 14 of the hopper. The front wall 14 of the hopper is located by suitable slides (not shown) which permit of an upward sliding movement of the front wall in its own plane, together with the attached scraper plate 20 and strengthening plate 21. Suitable stops (not shown) prevent the downward sliding movement under gravity of the front wall 14 of the hopper beyond the position illustrated in Fig. 1.

The bottom of the hopper 10 is formed by a movable feeder platform 22, constituting the front part of a movable plate 16, which is pivotally supported adjacent the lower edge of the rear wall of the hopper by two rollers 23 positioned so that portions of opposite edges of the platform 22 rest on the respective rollers. The rollers 23 permit with the minimum of friction forward and backward translatory oscillations of the plate 16 and the arrangement is such as to permit also rotational oscillations of the plate 16 over a certain angle while it is supported by the rollers. The plate 16 extends rearwardly from the rollers 23 over a distance slightly less than the horizontal distance between the front and rear walls of the hopper, and it is provided near its rear end with brackets 24 in which there can revolve a shaft 25 connected by a crank 26 to a driving shaft 27 to which is secured a chain wheel 28, arranged to be driven by a chain 29 and sprocket 30 from a motor 31. The operation of the motor results in the platform 22 undergoing translatory oscillations and rotational oscillations. The arrangement is such that when the platform 22 is in its uppermost position it contacts or nearly contacts the lower edge of the scrapper plate 20. The platform 22 is of such length that when it is in its uppermost position it extends a substantial distance forwardly beyond the scraper plate 20.

A row of equidistantly spaced teeth 32 is secured to the front edge 33 of the platform. The teeth have slightly upturned front ends but except for such ends lie in the plane of the platform 22 and in vertical planes parallel to the direction of movement of the grate upper run. The cross-sectional form of each tooth 32 is an equilateral triangle (Fig. 3) arranged with an apex facing the grate.

The teeth 32 extend forwardly a large part of the way, when the platform 22 is in its uppermost position, between the front edge 33 of the platform 22 and the screen 7. A horizontal steel plate 34 is arranged adjacent and to the rear of the lower edge 8 of the screen 7, and extends rearwardly a little over half the distance between the screen 7 and the normal position of the scraper plate 20. The teeth 32 even when the platform 22 is in its uppermost position remain spaced from the lower surface of the steel plate 34. The translatory and rotational oscillations of the platform 22 are arranged to be such that the teeth 32 in their lowermost positions just or nearly touch the upper surface of the grate 3. The steel plate 34 is so supported as to be capable of being lifted from the position described, to which it tends to return under its weight.

The space 35 between the screen 7 and the hopper 10 is suitably enclosed; in a cover plate 40 for the space 35 an aperture is provided by which gases may be drawn off as desired, under control of a damper (not shown), through a conduit 41, which may lead for instance to the stack receiving the flue gases from the boiler. A horizontal plate 42 whose front edge terminates adjacent to or in contact with the upper run of the grate, and a removable vertical plate 43 extending from the horizontal plate 42 to near the lower surface of the platform 22 adjacent the lower edge 12 of the hopper rear wall 11, and suitable side plates (not shown) inhibit the escape of gases from or the entry of air to the region below the platform at the lower end of the hopper.

Adjacent the rear of the upper surface of the horizontal plate 42 is provided a cross bar 44 suitably secured at its ends, to which cross bar are secured the front ends of a row of rods or bars 45 which extend forwardly from the cross bar 44 and each of which is of such length that, in resting loosely upon the upper surface of the grate, it extends into the flue 1. The bars are straight adjacent the cross bar 44, but below and forwardly of the screen 7 they have zig zag shapes. The bars may alternatively be of sinuous shapes. The foremost lengths of the bars are again straight.

The undergrate air for burning the slurry upon the grate is supplied in a usual manner. A dead plate 46 prevents the supply of ignition air through the grate to the slurry before it enters the region below the fire brick arch 6, and the partitions 47 prevent the escape of combustion air.

In operation, the motor 31 drives the shaft 27 in a counter-clockwise direction as seen in Fig. 1 and rotates the crank 26, as a result of which the brackets 24 move around a circle. The plate 16 therefore rocks and rolls on the rollers 23, whereby the platform 22 experiences a combination of translatory oscillations and rotational oscillations, the effect of which can be best described by referring to the path 48 traversed in a clockwise direction as seen in Fig. 1 by a point on one of the teeth 32 and by referring to Figs. 4, 5 and 6.

Starting from the uppermost position of the platform, in which it is in contact or nearly so with the scraper plate, the platform has first a downward and rearward motion, during which slurry in the hopper is given an opportunity to descend, while being supported by a surface assuming an increasing forward tilt. This first motion is followed by a second downward and forward motion, passing through positions such as that shown in Fig. 4, during which slurry resting on the platform, while the platform continues to increase its forward slope, is carried forwardly, while slurry in the hopper is permitted to descend further. The platform, after attaining a lowermost position, in which the tips of the teeth touch, or nearly touch the grate, moves in a third motion upwardly and forwardly, passing through positions such as that shown in Fig. 5, and during this motion slurry resting on the platform is drawn forwardly from below the hopper, while the platform is moving upwardly below the hopper tends to move slurry within the hopper upwardly. Subsequently the platform moves in a fourth motion upwardly, and rearwardly, passing through positions such as that shown in Fig. 6, and during this motion slurry which finds itself upon the foremost portion of the platform is progressively separated from the remainder of the slurry in the hopper by the narrowing of the distance between the lower edge of the scraper plate 20 and the platform 22, and a part of it falls from the platform as indicated at 49, by virtue of the reduction in the distance between the scraper plate 20 and the front edge 33 of the platform due to the rearward movement of the platform. At the same time the platform in moving upwardly continues the tendency to move the slurry within the hopper upwardly. Finally the platform attains a position in which it closes or substantially closes the bottom of the hopper, as shown in Fig. 1, whereafter it continues the cycle by recommencing the first motion, in the first part of which slurry continues to be edged over the front end 33 of the platform by the scraper plate 20.

During the second, third and fourth motions of the platform 22 the teeth 32 agitate slurry on the grate through which they pass. The forking action which the teeth have as regards the fuel bed already on the grate facilitates the formation of an open and uniform structure in the fuel bed. The triangular section of the teeth facilitates the downward movement of the teeth without any undue tendency to crush the slurry against the grate 9. The upward curve to the tips of the teeth avoids any danger of the teeth catching in the grate links.

During the third and fourth motions of the platform, lumps of slurry too large to pass between the teeth are moved upwardly by the teeth and may be broken by pressure against the under surface of the steel plate 34. The fact that the steel plate can be lifted prevents the possibility of damage by lumps too large or too hard to be immediately broken in this way. Hard lumps between the platform 22 and the lower edge of the scraper plate 20 can, if they do not become displaced forwardly or rearwardly as a whole or, after being broken, in parts, can cause the front wall 14 to be lifted, so that no damage to mechanism occurs.

The platform 22 effects an up and down movement of slurry in the hopper which is found to reduce the tendency for slurry to adhere to the front, back or side walls of the hopper, and in most cases to overcome the possibility that such adherence will totally prevent the feeding of slurry. The movement of slurry in the hopper promotes the mixing in the hopper of parts of the slurry of different moisture contents.

During the advance of slurry by the movement of the grate 3, the separating of some of the slurry on the platform 22 by the scraper plate 20 from the remainder below the hopper 10, the falling of slurry from the front edge 33 of the platform 22, the crushing of slurry between the teeth 32 and the steel plate 34, and the falling of crushed lumps through the spaces between the teeth 32, a stream of hot gases flows from the flue through the space below the screen 7 and below the steel plate 34 and into the space 35 on its way to the duct 41. It is evident that the slurry surfaces exposed to this gas stream are large. A relatively good drying is effected. Such drying renders it less likely that the fragments of crushed lumps will again cohere.

It will be seen that the boiler furnace is fired without the necessity for a fire door liable to cause compression of the slurry against the upper surface of the grate.

Hence the resistance of the fuel bed to the flow of the undergrate air therethrough is relatively low. Moreover the surface of the fuel bed is comparatively rough and broken, so that when it moves forwardly of the screen 7 it presents a large surface for absorbing radiation from the fire brick arch 6.

The slurry traveling forwardly with the grate is forced to ride over the bars 45 where they lie on the grate in zig zag shape and the resulting disturbing action in the fuel bed promotes a better flow of undergrate air into and through the fuel bed.

The bars 45 may, after removing the vertical plate 43, be inserted after the fire has been lit and subsequently withdrawn before the fire is shut down. Under normal operating conditions they are protected from the furnace heat by the fuel bed.

Thus the arrangement shown provides for the firing of a Lancashire boiler with coal slurry. The slurry is fed steadily to the stoker without the danger of stoppage due to adherence to the hopper walls and bridging in the hopper, while a high rate of heat release can be maintained on the limited grate area available with a traveling grate fired Lancashire boiler.

Fig. 7 illustrates a modification of the feeder described with reference to Figs. 1 to 6. There is shown part of the front wall 14 of a hopper, a scraper plate 20 at the lower edge thereof, part of a platform 22 mounted for combined translatory oscillations and rotational oscillations of the kind described in connection with Figs. 1 to 6, and a row of cutting teeth 50 mounted at the foremost edge of the platform. The teeth are mounted on a shaft 52 and normally extend substantially at right angles to the platform above the same. The shaft is provided with an arm 53 arranged for compressing a compression spring 54 should the teeth 50 be moved relative to the platform in the direction away from the scraper plate 20. A stop 58 prevents movement of the teeth beyond a certain point in the other direction. During the period when the platform is moving rearwardly the cutting teeth 50 approach the scraper plate and divide material which falls over the foremost edge of the platform. This arrangement is adapted for the case where the slurry contains lumps of clay or the like. Should a lump of any harder substance be encountered which does not go between the cutting teeth, the row of teeth yields to give it passage.

Figure 8:
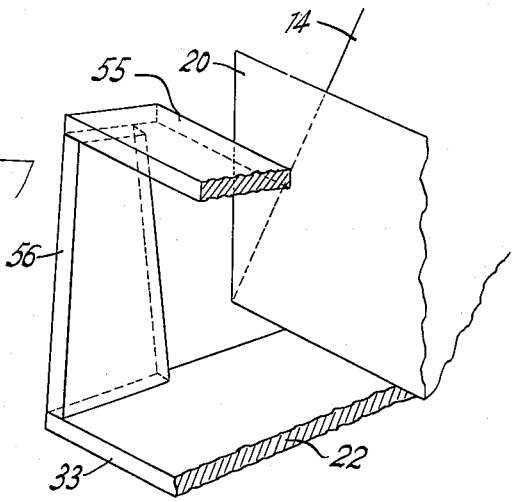
Fig. 8 is a perspective fragmentary view of another modification of the feeder.
Figure 9:
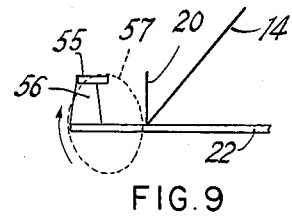
Fig. 9 shows the modification of Fig. 8 in sectional side elevation.

Figs. 8 and 9 illustrate another modification, adapted for a case where material is likely to interfere with proper feeder operation by adhering to the front surface of the scraper plate, the platform being provided with a sweep. The sweep consists of a bar 55 extending across the platform 22 adjacent its front edge 33 and supported therefrom by supports 56 at each end, which supports space it from the platform 22. The arrangement is such that as the platform 22 undergoes the translatory oscillations and rotational oscillations of the kind described with reference to Figs. 1 to 6 the rear edge of the bar 55 is moved at one period of its motion as shown at 57 downwardly and closely adjacent the front face of the scraper plate 20.

Figure 10:
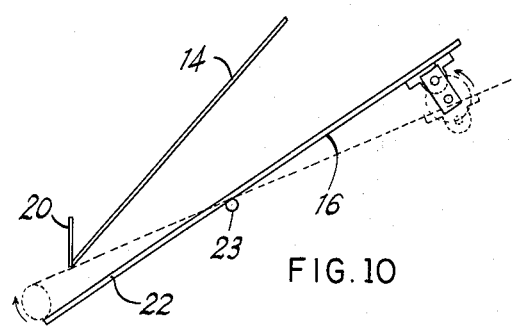
Figs. 10 and 11 illustrate side views of further modifications.

Fig. 10 illustrates another modification, in which the platform 22 forms at the same time an inclined bottom and the rear wall of the hopper; the downward and forward slope of the platform increases in some cases the amount of material discharged from the hopper during each cycle of movement of the platform.

Figure 11:
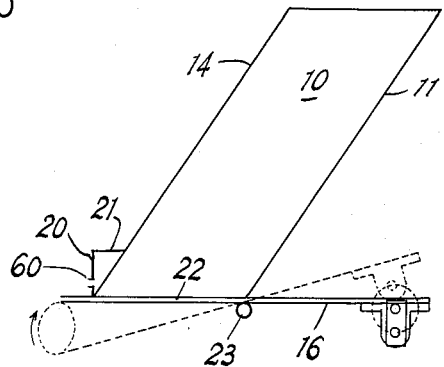

Fig. 11 illustrates another modification, showing the use of the space between the hopper front wall 14, scraper plate 20, and strengthening plate 21 to conduct gaseous fluid to a forwardly directed nozzle or nozzles 60 in the scraper plate 20. With this arrangement material can be blown forwardly from the foremost part of the surface of the platform 22. The gaseous fluid is chosen to have a substantial drying effect on the material on which it impinges and/or it is supplied in such quantity as to cause the material to be disrupted and scattered forwardly in falling from the platform. When material is fed onto a moving conveyor with such scattering there may be a tendency for greater uniformity in the thickness of the material layer on the conveyor.

While in accordance with the provisions of the statutes I have illustrated and described herein the best forms of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A feeder for divided solid material comprising a material hopper having walls, the bottom edges of which define a material discharge opening, a platform movably supported below said opening and in sliding contact with at least the rear edge of said opening, a platform supporting roll fixedly positioned adjacent the rear edge of said opening and in sliding contact with the underside of said platform, and means driving the platform in a combined downward and forward motion and thence in a combined upward and rearward motion while maintaining said sliding contact with said rear edge of the opening.

2. A feeder for divided solid material comprising a material hopper having walls, the bottom edges of which define a material discharge opening, a platform movably supported below said opening and in sliding contact with at least the rear edge of said opening, and means driving the platform in a combined downward and forward motion and thence in a combined upward and rearward motion while maintaining said sliding contact with said rear edge of the opening, and scraping means mounted above and arranged to clear material from the forward portion of said platform.

3. A feeder for divided solid material comprising a material hopper having walls, the bottom edges of which define a material discharge opening, a platform movably supported below said opening and in sliding contact with at least the rear edge of said opening, a crank connected to and arranged to drive the platform in a combined downward and forward motion and thence in a combined upward and rearward motion while maintaining said sliding contact with said rear edge of the opening, and scraping means mounted above and arranged to clear material from the forward portion of said platform.

4. A feeder for divided solid material comprising a material hopper having walls, the bottom edges of which define a material discharge opening, means slidably supporting the forward wall of said hopper to permit an upward sliding movement thereof, a platform movably supported below said opening and in sliding contact with at least the rear edge of said opening, a crank connected to and arranged to drive the platform in a combined downward and forward motion and thence in a combined upward and rearward motion while maintaining said sliding contact with said rear edge of the opening, and scraping means mounted above and arranged to clear material from the forward portion of said platform.

5. A feeder for divided solid material comprising a material hopper having walls, the bottom edges of which define a material discharge opening, a platform movably supported below said opening and in sliding contact with at least the rear edge of said opening, means driving the platform in a combined downward and forward motion and thence in a combined upward and rearward motion while maintaining said sliding contact with said rear edge of the opening, and scraping means mounted above and arranged to clear materials from the forward portions of said platform, said platform arranged to contact all of the edges of said hopper discharge opening and said scraping means in one position of said platform movement.

6. A feeder for divided solid material comprising a material hopper having walls, the bottom edges of which define a material discharge opening, a platform movably supported below said opening and in sliding contact with at least the rear edge of said opening, cutting means attached to the forward edge of said platform, and a crank connected to and arranged to drive the platform in a combined downward and forward motion and thence in a combined upward and rearward motion while maintaining said sliding contact with said rear edge of the opening.

7. A feeder for divided solid material comprising a material hopper having walls, the bottom edges of which define a material discharge opening, a platform movably supported below said opening and in sliding contact with at least the rear edge of said opening, means driving the platform in a combined downward and forward motion and thence in a combined upward and rearward motion while maintaining said sliding contact with said rear edge of the opening, scraping means mounted above and arranged to clear material from the forward portion of said platform, and crushing plate means yieldably mounted above and arranged to crush material in conjunction with the forward portion of said platform.

8. A feeder for divided solid material comprising a material hopper having walls, the bottom edges of which define a material discharge opening, a platform movably supported below said opening and in sliding contact with at least the rear edge of said opening, gaseous fluid discharge means arranged above said platform to scatter and dry the material as it leaves said platform, a crank connected to and arranged to drive the platform in a combined downward and forward motion and thence in a combined upward and rearward motion while maintaining said sliding contact with said rear edge of the opening, and scraping means mounted above and arranged to clear material from the forward portion of said platform.

9. An apparatus for feeding divided solid combustible material to a furnace comprising a traveling grate extending into said furnace, a hopper for said material having walls, the bottom edges of which define a material discharge opening, a platform positioned above said grate and movably supported below said opening and in sliding contact with at least the rear edge of said opening, a crank connected to and arranged to drive the platform in a combined downward and forward motion and thence in a combined upward and rearward motion while maintaining said sliding contact with said rear edge, and scraping means mounted above and arranged to clear material from the forward portion of said platform and push the material on to the grate.

10. An apparatus for feeding divided solid combustible material to a furnace comprising a traveling grate extending into said furnace, a hopper for said material having walls, the bottom edges of which define a material discharge opening, a platform positioned above said grate and movably supported below said opening and in sliding contact with at least the rear edge of said opening, a crank connected to and arranged to drive the platform in a combined downward and forward motion and thence in a combined upward and rearward motion while maintaining said sliding contact with said rear edge, scraping means mounted above and arranged to clear material from the forward portion of said platform and push the material on to the grate, and grate obstruction means extending forwardly over the upper surface of said traveling grate and arranged to continually agitate the bed of material carried by said grate.

11. A feeder for divided solid material comprising a material hopper having walls, the bottom edges of which define a material discharge opening, a platform movably supported below said opening and in sliding contact with at least the rear edge of said opening, means driving the platform in a combined downward and forward motion and thence in a combined upward and rearward motion while maintaining said sliding contact with said rear of the opening, scraping means mounted above and arranged to clear material from the forward portion of said platform, and scraper sweep means mounted on the forward portion of said platform and arranged to clear said scraping means of material.

References Cited in the file of this patent
UNITED STATES PATENTS

| | | |
|---|---|---|
| 565,224 | Richards | Aug. 4, 1896 |
| 740,097 | Davis | Sept. 29, 1903 |
| 1,456,353 | Bare | May 22, 1923 |
| 1,573,035 | Blatch | Feb. 16, 1926 |
| 1,880,287 | Sifton | Oct. 4, 1932 |
| 1,973,191 | Wiltfong | Sept. 11, 1934 |
| 2,386,336 | Mosshart | Oct. 9, 1945 |
| 2,587,379 | Petersen | Feb. 26, 1952 |